Patented Apr. 5, 1949

2,465,989

UNITED STATES PATENT OFFICE 2,465,989

PROCESS FOR PRODUCING ELEMENTAL BORON

Frank J. Sowa, Cranford, N. J.

No Drawing. Application June 8, 1945,
Serial No. 598,407

17 Claims. (Cl. 23—209)

The present invention relates to methods of making elemental boron, and particularly to methods of making amorphous boron by fusion of a metallic fluoborate with alkali or alkaline earth metals.

Heretofore elemental boron has been prepared by a variety of methods such as the fusion of boric oxide with metallic sodium, but the product from this reaction has been contaminated with a high percentage of suboxides of boron which cannot be economically removed. Another method used is the reduction of boric oxide with magnesium, but this also yields a very poor product. However, in practically all of these methods the reactions are incomplete or violent and difficult to control with the result that the yield of elemental boron is limited and the product is contaminated with impurities such as the suboxides of boron in amounts of up to 50% of the fusion product. These impurities cannot be removed by simple washing and leaching treatment with simple reagents, and therefore an inferior grade of elemental boron has been obtainable by such processes.

I have discovered that these objections to methods of the prior art can be overcome and a relatively high yield of a product of greater purity can be obtained by fusing a fluoborate salt with a metal selected from the alkali and alkaline earth metals provided the metal is distributed throughout the fusion mixture and preferably is in a finely divided state and intimately mixed with the fluoborate salt. The resulting reaction is easily controlled and yields a fused product which can be readily purified and contains a relatively high percentage of elemental boron, generally from 50 to 90% boron. Moreover, the reaction may be conducted so as to obtain by-products which are themselves of considerable value.

It is an object of the present invention to produce elemental boron economically and of a purity of from 50% to 90% boron by the fusion of a fluoborate salt with a metal selected from the alkali and alkaline earth metals.

Another object of the present invention is to produce elemental boron economically by a process wherein a by-product consisting of a fluoride salt of a metal selected from the alkali and alkaline earth metals is obtained.

Broadly stated the invention contemplates a fusion of a metal selected from the alkali and alkaline earth metals with a fluoborate salt of sodium, potassium, calcium or magnesium or with ammonium fluoborate. A preferred example is that in which potassium fluoborate is fused with metallic sodium. This is particularly advantageous because at fusion temperatures potassium fluoborate is stable while, for example, sodium fluoborate decomposes to some extent at fusion temperatures to yield sodium fluoride. The following equation illustrates the reaction which is believed to take place when sodium fluoborate is fused with sodium:

$$NaBF_4 + 3Na \rightarrow B + 4NaF$$

When potassium fluoborate is fused with sodium the reaction may be represented by the equation:

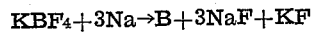

$$KBF_4 + 3Na \rightarrow B + 3NaF + KF$$

When the other metallic fluoborates are used the reaction yields, along with boron, the corresponding metal fluoride or mixture of metal fluorides. These metal fluorides such as sodium fluoride and potassium fluoride are valuable by-products and are obtained in substantially theoretical amounts. They can be used to prepare the fluoborate salts since they are obtained in a substantially pure form. When ammonium fluoborate is fused with a metal the product will be boron and a metal fluoride as well as a small amount of boron nitrides. Most of the ammonia of the ammonium fluoborate is lost from the fusion as gaseous ammonia or ammonium fluoride.

If the fluoborate salt is contaminated with silicates or aluminum compounds the boron obtained from the fusion will contain these metals or metallic salts as impurities, therefore in order to obtain elemental boron in as pure a state as possible it is preferable to use in the fusion a fluoborate salt of high purity and the best results have been obtained when a fluoborate salt of 95% or higher purity was used.

In order that the fusion be efficient and yield a product containing a minimum of impurities, it is important that the metal be distributed substantially uniformly throughout the reaction mass and for this purpose it should be in a finely divided state. When the metal is introduced into the mixture in the form of cut or comminuted particles the individual pieces should not be more than about $\tfrac{1}{16}$ inch in diameter. The size of the metal particles is also important for another reason since it has been found that when the size of the metal particles is ¼ inch in diameter or over, the fusion is too violent to give a good yield of elemental boron.

A preferred and novel method of introducing the metal in a finely divided state into the reaction mass consists in dissolving the metal in liquid ammonia and adding to this the fluoborate salt. Then by agitation and evaporation of the ammonia a residue is obtained which consists of a mass of fluoborate salt with the metal intimately dispersed and mixed therein. The fluoborate salt such as sodium, potassium or ammonium fluoborate is substantially soluble in liquid ammonia and when the solution of metal and fluoborate salt in liquid ammonia is evaporated the dissolved salt crystallizes and has deposited thereon a film of metal. Such an intimate mixture has been found to be advantageous in that the fusion is smooth and does not tend to violence. The amount of liquid ammonia required varies with the metal used as metals such as calcium and barium are less soluble than sodium and potassium. Ammonium fluoborate is more soluble in liquid ammonia than sodium and potassium fluoborate which are in turn more soluble than calcium or magnesium fluoborate. Therefore, if I desire to use liquid ammonia sufficient to dissolve both the metal and all of the salt more will be required where the metal or the salt are selected from the ones of less solubility in liquid ammonia.

Another method of dispersing the metal in the fusion mixture is by using an alloy of any two of the metals named above which is a liquid at room temperature. An example of such an alloy is a mixture containing equal parts of sodium and potassium. A satisfactory fusion mixture can be made by stirring the fluoborate salt into this alloy or adding the alloy to the fluoborate salt and stirring until there is an intimate mixture of the salt and metal.

I have also been able to obtain elemental boron containing up to 90% of boron in a process where the metal has been finely divided by mechanical means. Suitable mechanical means include manually cutting the metal into small pieces, extruding the metal so that a fine rod or ribbon of metal is obtained, or melting the metal in a solvent such as toluene, where sodium or potassium is used, and then rapidly shaking or agitating the hot solvent while the temperature is lowered to the melting point of the metal. In this way finely divided globules of the metal are obtained. It has also been found satisfactory to prepare the fusion mixture by milling the metal and fluoborate salt on rolls or in a ball mill.

The best results have been obtained when slightly more than the theoretical amount of metal is used in the fusion because the metals are highly reactive and it is difficult to prevent the presence in the reaction mixture of small amount of impurities resulting from the reaction of the metal with air, moisture, etc., which reaction to a varying degree decreases the amount of metal which reacts with a fluoborate. It is also desirable to have the fluoborate completely converted to boron, metal fluoride or fluorides in order that the product will not be contaminated with unreacted fluoborate.

Since the reaction mixture before and during the fusion is highly sensitive to oxidation by air and to moisture in the air due to the presence of free metal in a finely divided state, it is desirable to exclude air as far as possible from the said reaction mixture. One inexpensive and efficient method of doing this is to cover the fusion mixture with common salt before the fusion. The salt is readily removed from the fusion mixture by water washing after the completion of the fusion, since it is unchanged by the fusion.

In the process, where the metal is dissolved in liquid ammonia before the fusion, the salt is not added as a cover until substantially all of the ammonia has been evaporated. The fusion mixture, after being covered with a layer of sodium chloride or other inert material, is heated with a gas flame or other suitable means of introducing heat until the fusion reaction is initiated, whereupon the heating means is removed. The fusion can be carried out in a vessel which is covered or uncovered, and where the vessel is covered the covering of salt may be dispensed with, but it is generally found advisable even here to cover the fusion mixture with salt due to the extreme sensitivity to air of the free metal.

The fusion reaction is relatively mild and controlable and when started it travels throughout the mixture due to its exothermic nature. The temperature of the fusion is from 500 to 1000° F. and the reaction begins at approximately the melting point of sodium, then the temperature rises and the reaction becomes most vigorous at 800 to 1000° F. When the reaction subsides it may be desirable to heat by external means to insure the completion of the reaction.

The fusion mixture when cool is ground to a state of fineness of 50 mesh or smaller and added slowly and carefully to water, since there may be present small amounts of unreacted sodium. The water suspension is then boiled for one hour and filtered to render it substantially free from water soluble salts. The solid is next boiled for from 15 minutes to 2 hours with 10 to 50% hydrochloric or sulfuric acid, hydrochloric acid being preferred. The solution is then filtered and dried. This last treatment substantially removes metallic borides.

If the method of dispersing the free metal has been by dissolving the metal in liquid ammonia the fusion product after washing with water may be heated with a bi-fluoride such as ammonium bi-fluoride although other bi-fluorides may be used. This step is effected by thoroughly mixing the reaction product with the bi-fluoride and heating until the mixture melts. The mixture is held at or above its melting point for from 15 to 20 minutes and then is cooled and washed with several portions of water and dried. This step removes any nitrides which are present presumably by solution of the nitrides in the bi-fluoride salt. Such solution also removes the last traces of magnesium or other borides in the fusion product. The amount of bi-fluoride to be used is approximately 10 times the weight of the fusion product after the first washing step and therefore may be used to remove nitrides from several batches of the fusion products. If the free metal has been dispersed by simple mechanical means, the step of heating with a bi-fluoride is unnecessary. In both cases the washed and dried product contains a high percentage of elemental boron.

Specific examples whereby my invention may be practiced are set out below in order to indicate the nature of my invention.

Example I 23 grams of sodium which had been cut into pieces having a diameter less than 3/16 inch was intimately mixed with 42 grams of potassium fluoborate ($KBF_4$). The mixture was placed in an iron tube two inches in diameter and six inches long, a layer of sodium chloride one inch deep was added and a cap was secured on the tube. The tube was heated until the fusion reaction started and when the fusion reaction had subsided the tube was allowed to cool, the cap was then removed, the salt poured off and the fusion mixture ground to a fineness of 50 mesh. The finely divided product was digested in boiling water for one hour and filtered. The filtrate contained substantially theoretical amounts of sodium fluoride and potassium fluoride, that is about 40 grams of sodium fluoride and about 15 grams of potassium fluoride. These can be recovered by evaporation of the filtrate and may be used directly for producing mixed fluoborate salts for use in recovering further elemental boron or they may be separated and purified by fractional crystallization of the filtrate. The solid was digested in boiling 25% HCl for one-half hour, filtered and dried. The resulting product was found to contain 84% of elemental boron.

In place of the sodium used in the foregoing example I have employed 39 grams of potassium and have used 7 grams of lithium, carrying out the remaining steps of the operation as described above.

*Example II*

92 grams of sodium metal was dissolved in 500 cc. of liquid ammonia in a stainless steel beaker, 126 grams of potassium fluoborate was well mixed in the solution and the ammonia allowed to evaporate. A layer of sodium chloride one inch deep was placed on the top of the mixture and a stainless steel cover was put on top of the beaker. The fusion progressed smoothly and when it subsided the contents of the beaker were ground to a fineness of 50 mesh and washed with boiling water by decantation several times. The product was then filtered and the solid was boiled with 25% HCl for one-half hour, filtered and dried. The product was heated with 2200 grams of ammonium bi-fluoride until the mixture was molten and kept in a molten state for 20 minutes. The mixture was cooled and washed several times with water, filtered and dried. The resulting product contained 70% elemental boron.

*Example III*

15.25 grams of sodium metal was cut into small pieces and melted in a stainless steel beaker. 27.5 grams of sodium fluoborate (NaBF₄) was stirred into the molten sodium metal. During the stirring and after the NaBF₄ had been all added the fusion reaction started and the heating was discontinued. When the fusion reaction had subsided and the fusion mass was cool the mass was ground to a fineness of 50 mesh and boiled with water for one hour, filtered and boiled with 10% hydrochloric acid solution for one-half hour, filtered and dried. The product contained 72% of elemental boron.

In place of the alkali metals used in the foregoing examples I have used calcium and magnesium while other alkali and alkaline earth metals may be used. Similarly ammonium and calcium fluoborate may be used instead of sodium or potassium fluoborates. In general however, I prefer to use metals and metal salts of the alkali group because purification of the fused product is simpler than where, for example calcium metal is used or the fluoborate is calcium fluoborate, since calcium fluoride, a by-product of such a fusion mixture is more difficult to remove from the fusion products than, say sodium or potassium fluoride, because of its being more difficulty soluble in water or other aqueous media.

While I have indicated preferred procedure and have cited specific examples of my invention in the foregoing description it will be understood that numerous changes and modifications may be used and will be apparent to those skilled in the art. In view thereof it should be understood that the embodiments of my invention particularly described are intended to be illustrative only and are not intended to limit the scope of the following claims.

I claim:

1. A method of producing elemental boron which comprises the steps of intimately contacting a metal selected from the group consisting of alkali and alkaline earth metals, with a fluoborate salt selected from the group consisting of sodium, potassium, calcium, magnesium and ammonium fluoborates, fusing the resulting mixture dissolving out impurities from the fusion mass and recovering elemental boron from the residue remaining.

2. A method of producing elemental boron which comprises the steps of finely dividing a metal selected from the group consisting of alkali and alkaline earth metals by mechanical means, mixing the finely divided metal with a fluoborate salt selected from the group consisting of sodium, potassium, calcium, magnesium and ammonium fluoborate, fusing the resulting mixture dissolving out impurities from the fusion mass and recovering elemental boron from the residue remaining.

3. A method of producing elemental boron according to claim 2 in which the metal consists of pieces not exceeding about $\tfrac{1}{16}$ inch in diameter.

4. A method of producing elemental boron which comprises the steps of extruding a metal selected from the group consisting of alkali and alkaline earth metals, mixing the extruded metal with a fluoborate salt selected from the group consisting of sodium, potassium, calcium, magnesium and ammonium fluoborate, fusing the resulting mixture dissolving out impurities from the fusion mass and recovering elemental boron from the residue remaining.

5. A method of producing elemental boron according to claim 4 in which the largest pieces of the extruded metal do not exceed about $\tfrac{1}{16}$ inch in diameter.

6. A method of producing elemental boron which comprises the steps of dissolving a metal selected from the group consisting of alkali and alkaline earth metals in liquid ammonia, adding a fluoborate salt selected from the group consisting of sodium, potassium, calcium, magnesium and ammonium fluoborate, evaporating the liquid ammonia, fusing the resulting mixture dissolving out impurities from the fusion mass and recovering elemental boron from the residue remaining.

7. A method of producing elemental boron according to claim 1 in which the fusion temperature is between 500 and 1000° F.

8. A method of producing elemental boron which comprises the steps of dissolving a metal selected from the group consisting of alkali and alkaline earth metals in liquid ammonia, adding a fluoborate salt selected from the group consisting of sodium, potassium, calcium, magnesium and ammonium fluoborate, evaporating the liquid ammonia, fusing the resulting product, removing soluble impurities from the resulting reaction mass, thereafter reacting said mass with ammonium bi-fluoride dissolving out impurities from the fusion mass and recovering elemental boron from the residue remaining.

9. A method of producing elemental boron according to claim 1 in which the intimately contacted metal and fluoborate is covered with a layer of sodium chloride and the resulting mixture is fused.

10. A method of producing elemental boron according to claim 1 in which the intimately contacted metal and fluoborate is covered with a layer of an inert material and the resulting mixture is fused.

11. A method of producing elemental boron which comprises the steps of intimately contacting a metal selected from the group consisting of alkali and alkaline earth metals with a fluoborate salt selected from the group consisting of sodium, potassium, calcium, magnesium and ammonium fluoborate, fusing the resulting mixture, and dissolving out impurities from the resulting fused product.

12. A method of producing elemental boron which comprises the steps of intimately contacting an alloy of two metals selected from the group consisting of alkali and alkaline earth metals with a fluoborate salt selected from the group consisting of sodium, potassium, calcium, magnesium and ammonium fluoborate, fusing the resulting mixture dissolving out impurities from the fusion mass and recovering elemental boron from the residue remaining.

13. A method of producing elemental boron according to claim 12 in which the two metals selected from the group consisting of alkali and alkaline earth metals are sodium and potassium.

14. A method of producing elemental boron according to claim 1 in which the metal is sodium and the alkaline fluoborate is potassium fluoborate.

15. A method of producing elemental boron according to claim 2 in which the metal is sodium and the fluoborate salt is potassium fluoborate.

16. A method of producing elemental boron according to claim 6 in which the metal is sodium and the fluoborate salt is potassium fluoborate.

17. In a method of producing elemental boron which comprises the steps of intimately contacting a metal selected from the group consisting of alkali and alkaline earth metals, with a fluoborate salt selected from the group consisting of sodium, potassium, calcium, magnesium and ammonium fluoborates, fusing the resulting mixture, dissolving out water soluble substances from the fusion product, to recover elemental boron from the insoluble residue and separating metal fluorides produced by the reaction from the solution thus obtained.

FRANK J. SOWA.

REFERENCES CITED

The following references are of record in the file of this patent:

UNITED STATES PATENTS

| Number | Name | Date |
|---|---|---|
| 676,548 | Reich | June 18, 1901 |
| 2,053,174 | Booth | Sept. 1, 1936 |
| 2,172,969 | Eringer | Sept. 12, 1939 |

OTHER REFERENCES

Abrahall, Jour. Chem. Soc. (London), vol. LXI, p. 655 (1892).